(12) United States Patent
Choi et al.

(10) Patent No.: US 11,722,687 B2
(45) Date of Patent: *Aug. 8, 2023

(54) EFFICIENT SIGNALING OF PICTURE SIZE AND PARTITIONING INFORMATION

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,442

(22) Filed: Sep. 17, 2021

(65) Prior Publication Data

US 2022/0007044 A1 Jan. 6, 2022

Related U.S. Application Data

(63) Continuation of application No. 17/026,967, filed on Sep. 21, 2020, now Pat. No. 11,178,418.

(Continued)

(51) Int. Cl.
*H04N 19/46* (2014.01)
*H04N 19/122* (2014.01)
(Continued)

(52) U.S. Cl.
CPC ........... *H04N 19/46* (2014.11); *H04N 19/119* (2014.11); *H04N 19/122* (2014.11); *H04N 19/136* (2014.11)

(58) Field of Classification Search
CPC .... H04N 19/46; H04N 19/119; H04N 19/122; H04N 19/136; H04N 19/172; H04N 19/70
See application file for complete search history.

(56) References Cited

U.S. PATENT DOCUMENTS 11,178,418 B2 * 11/2021 Choi .................. H04N 19/70
2014/0219346 A1 * 8/2014 Ugur .................. H04N 19/105
375/240.12

(Continued)

OTHER PUBLICATIONS

Joint Video Experts Team (JVET) of ITU-T SG 16 WP 3 and ISO/IEC JTC 1/SC 29/WG 11, 15th Meeting: Gothenburg, SE, Jul. 3-12, 2019.

(Continued)

*Primary Examiner* — Tat C Chio
(74) *Attorney, Agent, or Firm* — Sughrue Mion, PLLC

(57) ABSTRACT

A method of efficient signalizing of picture size and partitioning information in a video bitstream, is performed by at least one processor and includes obtaining, from a sequence parameter set (SPS) to which a coded picture refers, a flag indicating whether the picture size and partitioning information of the coded picture is included in the SPS, and determining whether the obtained flag indicates that the picture size and partitioning information is included in the SPS. The method further includes based on the flag being determined to indicate that the picture size and partitioning information is included in the SPS, obtaining, from the SPS, the picture size and partitioning information, and based on the flag being determined to indicate that the picture size and partitioning information is not included in the SPS, obtaining, from a video parameter set (VPS), the picture size and partitioning information that is included in the VPS.

17 Claims, 9 Drawing Sheets

Related U.S. Application Data

(60) Provisional application No. 62/907,344, filed on Sep. 27, 2019.

(51) Int. Cl.
  *H04N 19/119* (2014.01)
  *H04N 19/136* (2014.01)

(56) References Cited

U.S. PATENT DOCUMENTS

| | | | |
|---|---|---|---|
| 2016/0255373 A1 | 9/2016 | Deshpande | |
| 2018/0027246 A1* | 1/2018 | Liu | H04N 19/463 375/240.02 |
| 2018/0160118 A1 | 6/2018 | Tsukuba et al. | |
| 2022/0103868 A1* | 3/2022 | Park | H04N 19/132 |

OTHER PUBLICATIONS

International Search Report dated Jan. 12, 2021 in International Application No. PCT/US2020/052198.
Written Opinion of the International Searching Authority dated Jan. 12, 2021 in International Application No. PCT/US2020/052198.
Byeongdoo Choi et al., "AHG9: VPS and SPS design", Joint Collaborative Team on Video Coding (JCT-VC), of ITU-T SG 16 WP 3 and ISO/IEC JTC 1/SC 29/WG 11, JCTVC-K0209, 11th Meeting, Shanghai, CN, Oct. 10-19, 2012, pp. 1-5 (6 pages total).
Hendry et al., "AHG8: Support for reference picture resampling—handling of picture size signalling, conformance windows, and DPB management", WG 05 MPEG Joint Video Coding Team(s), with ITU-T SG 16, JVET-O0133-v2, Jun. 2019, pp. 31-37 (9 pages total).
Office Action dated Sep. 20, 2022 in Japanese Application No. 2021-553106.
Extended European Search Report dated Jun. 13, 2023 in International Application No. PCT/US2020/052198.
He (Interdigital) Y et al: "AHG12: On picture and sub-picture signaling", JVET Meeting; Jul. 3, 2019-Jul. 12, 2019; Gothenburg; (The Joint Video Exploration Team of ISO/IEC JTC1/SC29/WG11 and ITU-T SG. 16), No. JVET—O0182 ; m48288 Jun. 26, 2019 (Jun. 26, 2019), XP030218772, Retrieved from the Internet : URL :http ://phenix.int-evry.fr/jvet/doc_end_user/documents/15_Gothenburg/wg11/JVET-O0182-v2.zip JVET-O0182_r1.docx [retrieved on Jun. 26, 2019].
Choi (Tencent) B et al : "AHG8/AHG12: Efficient signaling of picture size and partioning information", 16. JVET Meeting; Oct. 1, 2019-Oct. 11, 2019; Geneva; (The Joint Video Exploration Team of ISC/IEC JTC1/SC29/WG11 and ITU-T SG. 16) No. JVET-P0223 ; m50187 Sep. 27, 2019 (Sep. 27, 2019), XP030216623, Retrieved from the Internet : URL :http ://phenix.int-evry.fr/jvet/doc_end_user/documents/16_Geneva/wg11/JVET-P0223-v1.zip JVPET-P0223 Efficient signaling of picture size and partioning information. docx [retrieved on Sep. 27, 2019].

* cited by examiner

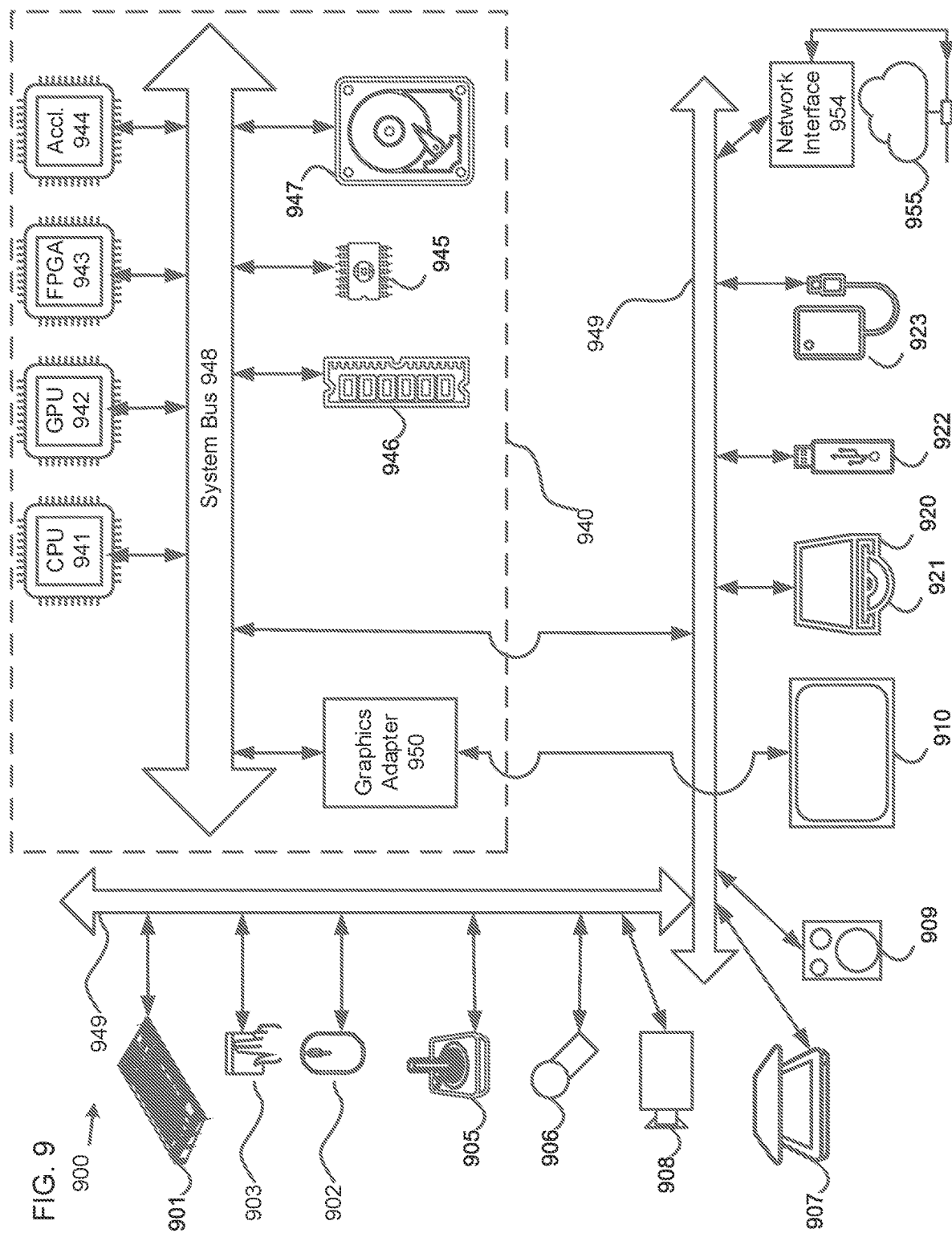

EFFICIENT SIGNALING OF PICTURE SIZE AND PARTITIONING INFORMATION

CROSS-REFERENCE TO RELATED APPLICATION

This application is a Continuation of U.S. patent application Ser. No. 17/026,967 filed Sep. 21, 2020, which claims priority from U.S. Provisional Patent Application No. 62/907,344, filed on Sep. 27, 2019, in the U.S. Patent and Trademark Office, which are incorporated herein by reference in their entirety.

BACKGROUND

1. Field

Methods and apparatuses consistent with embodiments relate to video coding, and more particularly, a method and an apparatus for efficient signalizing of picture size and partitioning information in a video bitstream.

2. Description of Related Art

In block-based hybrid video coding, each picture is partitioned into blocks of samples, and multiple blocks within a picture are aggregated to form slices as independently decodable entities. For block-based video coding, a picture may be partitioned into several blocks, which may also be referred to as coding tree units (CTUs), coding units (CUs), and/or coding blocks (CBs).

FIG. 1 shows an example of a partitioning structure of High Efficiency Video Coding (HEVC). HEVC employs a quad-tree coding block partitioning structure that enables a flexible use of large and small coding, prediction, and transform blocks.

In Versatile Video Coding (VVC), a set of syntax elements specifying a picture size, sub-picture partitioning information, tile partitioning information, rectangular slice partitioning information and conformance window offsets is repeatedly signaled in parameter sets.

SUMMARY

According to embodiments, a method of efficient signalizing of picture size and partitioning information in a video bitstream, is performed by at least one processor and includes obtaining, from a sequence parameter set (SPS) to which a coded picture refers, a flag indicating whether the picture size and partitioning information of the coded picture is included in the SPS, and determining whether the obtained flag indicates that the picture size and partitioning information is included in the SPS. The method further includes, based on the flag being determined to indicate that the picture size and partitioning information is included in the SPS, obtaining, from the SPS, the picture size and partitioning information, and based on the flag being determined to indicate that the picture size and partitioning information is not included in the SPS, obtaining, from a video parameter set (VPS), the picture size and partitioning information that is included in the VPS.

An apparatus for efficient signalizing of picture size and partitioning information in a video bitstream, includes at least one memory configured to store computer program code, and at least one processor configured to access the at least one memory and operate according to the computer program code. The computer program code includes first obtaining code configured to cause the at least one processor to obtain, from a sequence parameter set (SPS) to which a coded picture refers, a flag indicating whether the picture size and partitioning information of the coded picture is included in the SPS, and first determining code configured to cause the at least one processor to determine whether the obtained flag indicates that the picture size and partitioning information is included in the SPS. The computer program code further includes second obtaining code configured to cause the at least one processor to, based on the flag being determined to indicate that the picture size and partitioning information is included in the SPS, obtain, from the SPS, the picture size and partitioning information, and third obtaining code configured to cause the at least one processor to, based on the flag being determined to indicate that the picture size and partitioning information is not included in the SPS, obtain, from a video parameter set (VPS), the picture size and partitioning information that is included in the VPS.

A non-transitory computer-readable storage medium storing instructions that cause at least one processor to obtain, from a sequence parameter set (SPS) to which a coded picture refers, a flag indicating whether the picture size and partitioning information of the coded picture is included in the SPS, and determine whether the obtained flag indicates that the picture size and partitioning information is included in the SPS. The instructions further cause the at least one processor to, based on the flag being determined to indicate that the picture size and partitioning information is included in the SPS, obtain, from the SPS, the picture size and partitioning information, and based on the flag being determined to indicate that the picture size and partitioning information is not included in the SPS, obtain, from a video parameter set (VPS), the picture size and partitioning information that is included in the VPS.

BRIEF DESCRIPTION OF THE DRAWINGS

FIG. 9 is a diagram of a computer system suitable for implementing embodiments.

DETAILED DESCRIPTION

Figure 1:
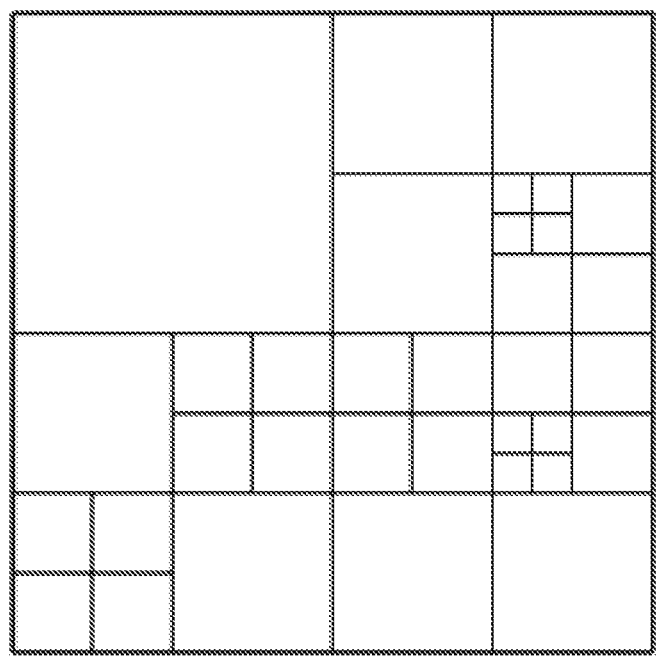
FIG. 1 is a diagram of a partitioning structure of HEVC.
Figure 2:
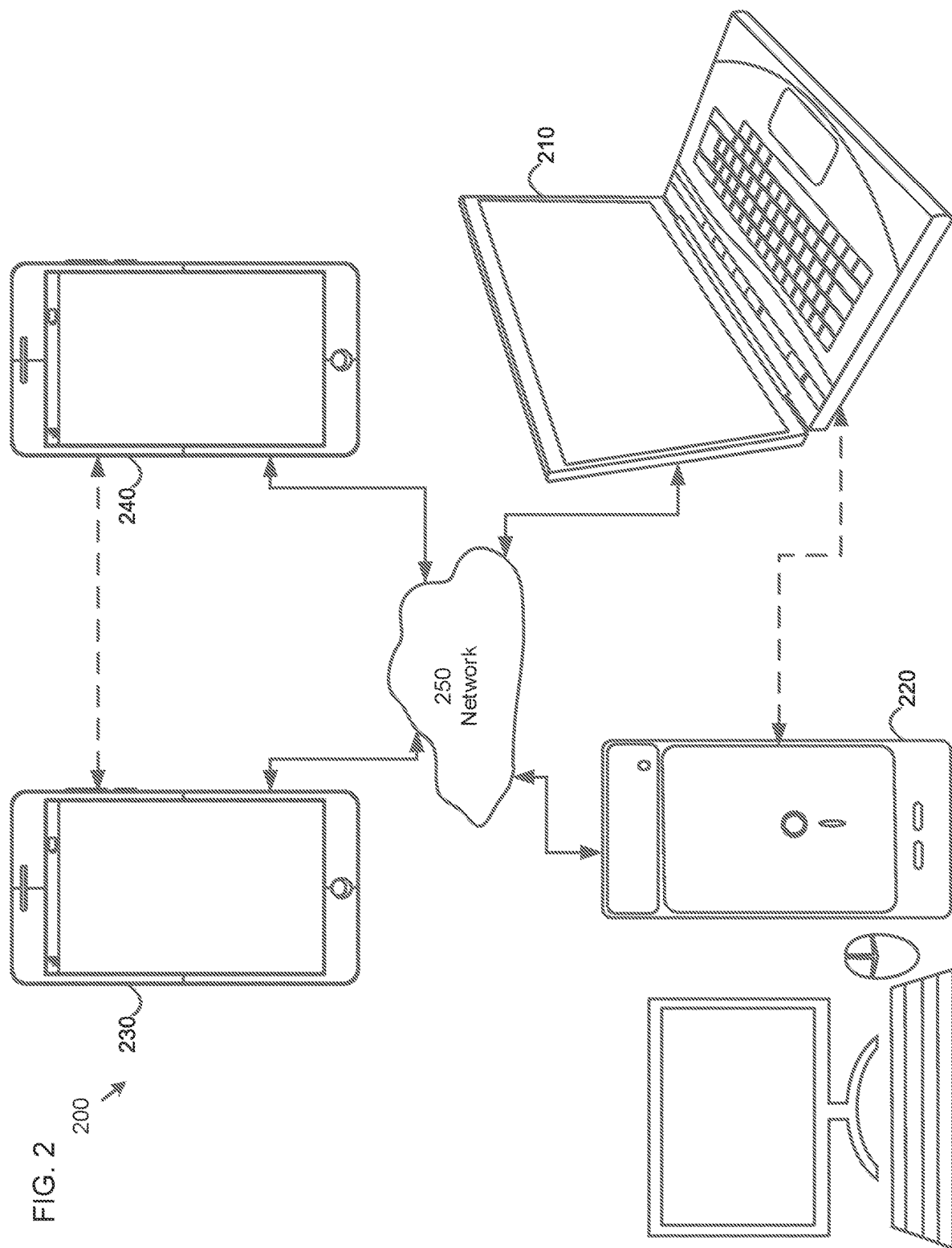
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
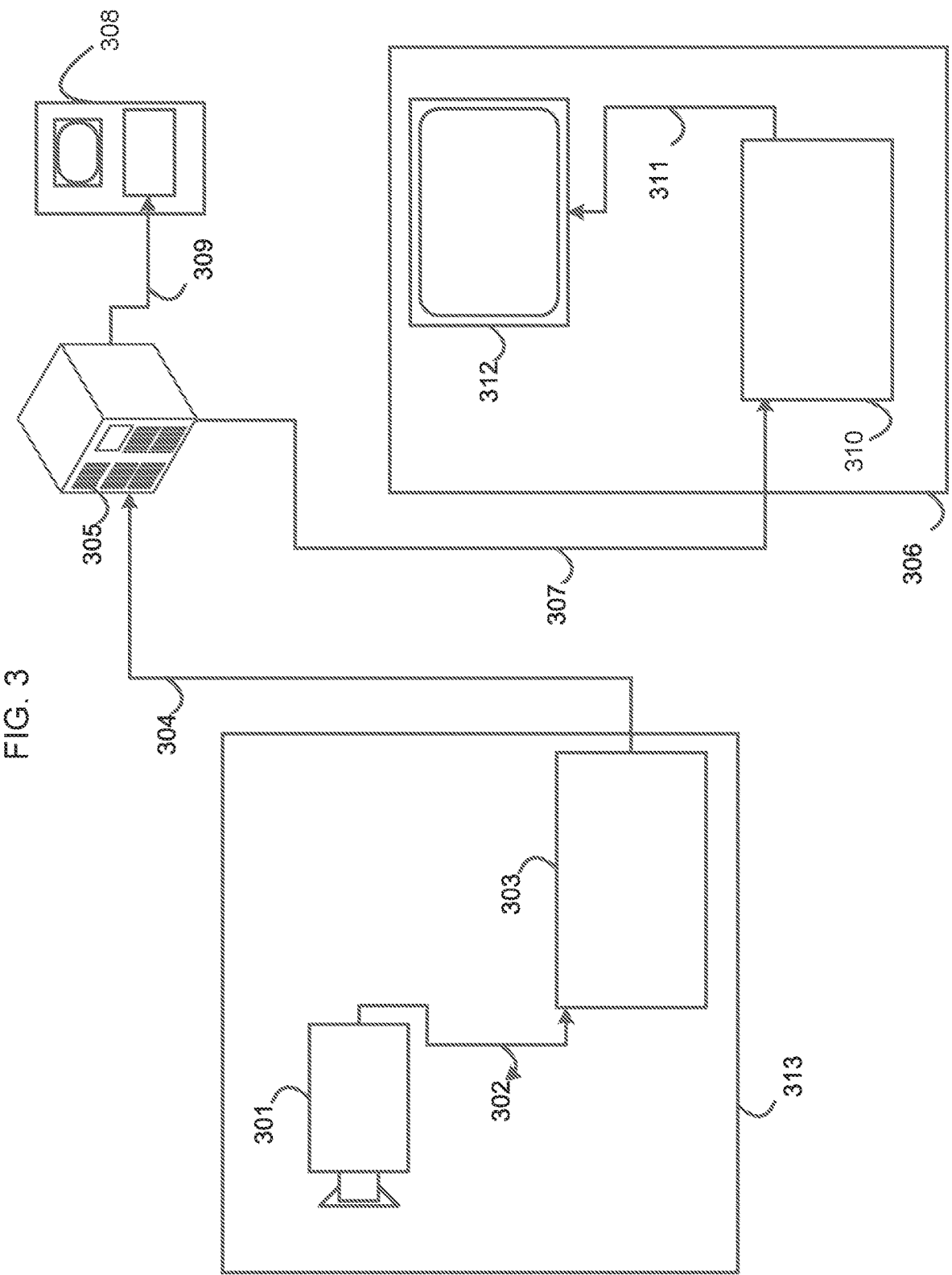
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310), which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
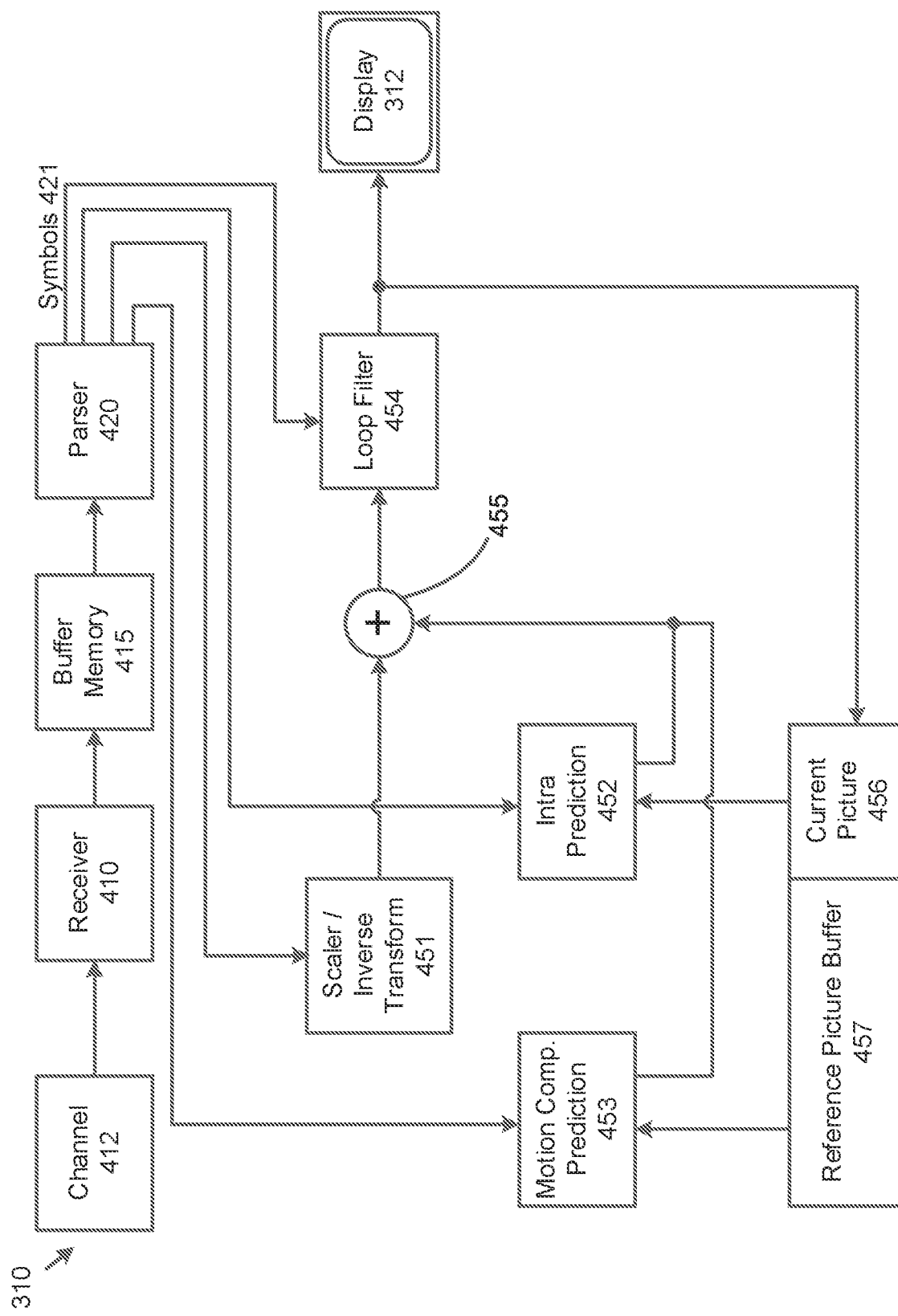
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); in the same or embodiments, one coded video sequence at a time, where the decoding of each coded video sequence is independent from other coded video sequences. The coded video sequence may be received from a channel (412), which may be a hardware/software link to a storage device, which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks including sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
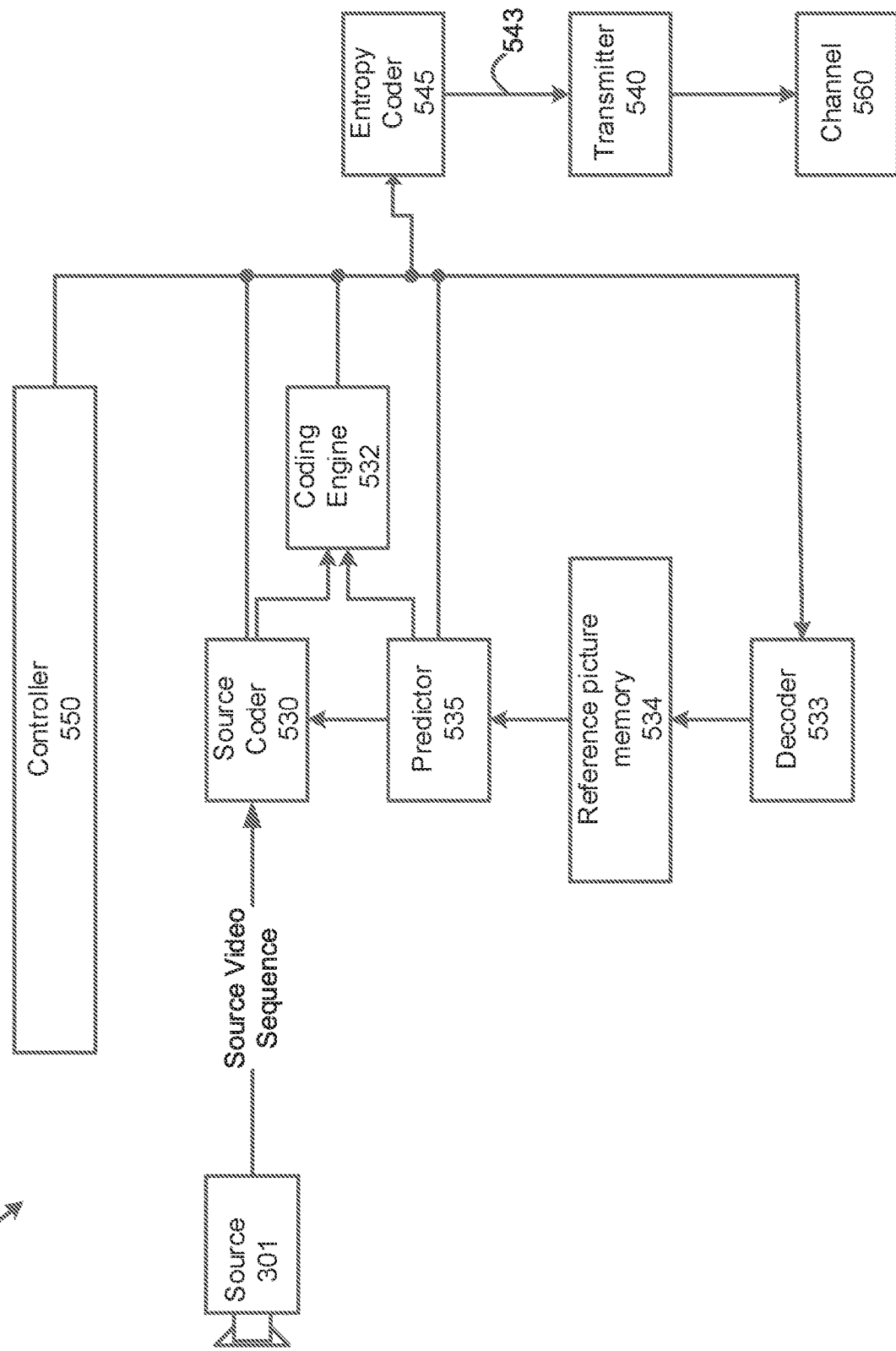
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may include temporal/spatial/SNR enhancement layers, other forms of redundant data such as redundant pictures and slices, Supplementary Enhancement Information (SEI) messages, Visual Usability Information (VUI) parameter set fragments, and so on.

For bit-efficient signaling and pre-notification of picture size and partitioning information, embodiments described herein include a hierarchical signaling mechanism of the picture size and partitioning information. In a video parameter set (VPS), all candidates of the picture size and partitioning information pic_size_partitioning_info( )) are listed, which may be present in any layer of coded video sequences (CVS) referring to the VPS. In a sequence parameter set (SPS), indexes are listed and refer to the candidates in the VPS and additional candidates of the picture size and partitioning information pic_size_partitioning_info( ) which may be referred to by an index in a picture parameter set (PPS) referring to the SPS. In the PPS, an index is signaled and indicates the picture size and partitioning information pic_size_partitioning_info( ) listed in the SPS, which the PPS refers to. If necessary, some parts of the picture size and partitioning information pic_size_partitioning_info( ) may be updated in the PPS. Specification text follows below.

The VPS is specified in Table 1 below:

TABLE 1

| | Descriptor |
|---|---|
| video_parameter_set_rbsp( ) { | |
| ... | |
|   vps_num_pic_size_partitioning_info_minus1 | ue(v) |
|   for(i = 0; i <= vps_num_pic_size_partitioning_info_minus1; i++) | |
|     pic_size_partitioning_info( ) | |
| ... | |
| } | | vps_num_pic_size_partitioning_info_minus1 plus 1 specifies a number of the picture size and partitioning information pic_size_partitioning_info( )) listed in the VPS.

The SPS is specified in Table 2 below:

TABLE 2

| | Descriptor |
|---|---|
| seq_parameter_set_rbsp( ) { | |
| ... | |
|   sps_num_pic_size_partitioning_info_minus1 | ue(v) |
|   for(i = 0; i <= sps_num_pic_size_partitioning_info_minus1; i++) | |
|     sps_additional_pic_size_partitioning_info_flag[i] | u(1) |
|     if( sps_additional_pic_size_partitioning_info_flag[i]) | |
|       pic_size_partitioning_info( ) | |
|     else | |
|       sps_vps_pic_size_partitioning_info_idx[i] | u(1) |
| ... | |
| } | | sps_num_pic_size_partitioning_info_minus1 plus 1 specifies a number of picture size and the partitioning information pic_size_partitioning_info( ) listed in the SPS.

sps_additional_pic_size_partitioning_info_flag[i] equal to 0 specifies that an index sps_vps_pic_size_partitioning_info_dx[i] is present. sps_additional_pic_size_partitioning_info_flag[i] equal to 1 specifies that an i-th picture size and partitioning information pic_size_partitioning_info( ) listed in this SPS is present, without referring to the picture size and partitioning information pic_size_partitioning_info( )) listed in the VPS.

sps_vps_pic_size_partitioning_info_idx[i] specifies that an i-th picture size and partitioning information pic_size_partitioning_info( ) listed in this SPS is equal to the an sps_vps_pic_size_partitioning_info_idx[ i]-th picture size and partitioning information pic_size_partitioning_info( ) listed in the VPS that this SPS refers to.

The PPS is specified in Table 3 below:

TABLE 3

| | Descriptor |
|---|---|
| pic_parameter_set_rbsp( ) { | |
| ... | |
|   pps_sps_pic_size_partitioning_info_idx | u(1) |
|   pps_pic_size_partitioning_info_update_flag | u(1) |
|   if(pps_pic_size_partitioning_info_update_flag) | |
|     pic_size_partitioning_update_info( ) | |
| ... | |
| } | | pps_sps_pic_size_partitioning_info_idx specifies that picture size and partitioning information pic_size_partitioning_info( ) of each coded picture referring to this PPS is equal to a pps_sps_pic_size_partitioning_info_idx-th picture size and partitioning information pic_size_partitioning_info( ) listed in the SPS that this PPS refers to.

pps_pic_size_partitioning_info_update_flag equal to 1 specifies that an update of the picture size and partitioning information pic_size_partitioning_update_info( ) is present in the PPS.

The picture size and partitioning information pic_size_partitioning_info( ) is specified in Table 4 below:

TABLE 4

| | Descriptor |
|---|---|
| pic_size_partitioning_info( ) { | |
|   pic_width_in_luma_samples | u(16) |
|   pic_height_in_luma_samples | u(16) |
|   conf_win_present_flag | u(1) |
|   if(conf_win_present_flag) | |
|     conf_win_info( ) | |

TABLE 4-continued

| | Descriptor |
|---|---|
| tile_brick_partitioning_present_flag | u(1) |
| if(tile_brick_partitioning_present_flag) { | |
|   tile_brick_partitioning_info( ) | |
|   rect_slice_partitioning_present_flag | u(1) |
|   if(rect_slice_partitioning_present_flag) | |
|     rect_slice_partitioning_info( ) | |
|   subpic_partitioning_present_flag | u(1) |
|   if(subpic_partitioning_present_flag) { | |
|     subpic_partitioning_info( ) | |
|     subpic_conf_win_present_flag | u(1) |
|     if(subpic_conf_win_present_flag) | |
|       subpic_conf_win_partitioning_info( ) | |
|   } | |
| } | |
| } | | conf_win_present_flag equal to 1 specifies that conf_win_ info( ) is present in this picture size and partitioning information pic_size_partitioning_info( ) conf_win_ present_flag equal to 0 specifies that conf_win_info( ) is not present in this picture size and partitioning information pic_size_partitioning_info( ) conf_win_info( ) indicates conformance window offsets.

tile_brick_partitioning_present_flag equal to 1 specifies that
tile_brick_partitioning_info( ) is present in this picture size and partitioning information pic_size_partitioning_info( ) tile_brick_partitioning_present_flag equal to 0 specifies that tile_brick_partitioning_info( ) is not present in this picture size and partitioning information pic_size_partitioning_info( ) tile_brick_partitioning_info( ) indicates tile brick partitioning information.

rect_slice_partitioning_present_flag equal to 1 specifies that rect_slice_partitioning_info( ) is present in this picture size and partitioning information pic_size_partitioning_info( ). rect_slice_partitioning_present_flag equal to 0 specifies that rect_slice_partitioning_info( ) is not present in this picture size and partitioning information pic_size_partitioning_info( ) rect_slice_partitioning_info( ) indicates rectangular slice partitioning information.

subpic_partitioning_present_flag equal to 1 specifies that subpic_partitioning_info( ) is present in this picture size and partitioning information pic_size_partitioning_info( ) subpic_partitioning_present_flag equal to 0 specifies that subpic_partitioning_info( ) is not present in this picture size and partitioning information pic_size_partitioning_info( ) subpic_partitioning_info( ) indicates sub-picture partitioning information.

subpic_conf_win_present_flag equal to 1 specifies that subpic_conf_win_info( ) is present in this picture size and partitioning information pic_size_partitioning_info( ) subpic_conf_win_present_flag equal to 0 specifies that subpic_conf_win_info( ) is not present in this picture size and partitioning information pic_size_partitioning_info( ) subpic_conf_win_info( ) indicates sub-picture conformance window offsets.

pic_size_partitioning_update_info( ) specifies the update of the picture size and partitioning information pic_size_partitioning_info( ) and is specified in Table 5 below:

TABLE 5

| | Descriptor |
|---|---|
| pic_size_partitioning_update_info( ) { | |
|   pic_size_update_flag | u(1) |

TABLE 5-continued

| | Descriptor |
|---|---|
| if(pic_size_update_flag) { | |
|   updated_pic_width_in_luma_samples | u(16) |
|   updated_pic_height_in_luma_samples | u(16) |
| } | |
| conf_win_update_flag | u(1) |
| if(conf_win_update_flag) | |
|   conf_win_info( ) | |
| tile_brick_partitioning_update_flag | u(1) |
| if(tile_brick_partitioning_update_flag) | |
|   tile_brick_partitioning_info( ) | |
| rect_slice_partitioning_update_flag | u(1) |
| if(rect_slice_partitioning_update_flag) | |
|   rect_slice_partitioning_info( ) | |
| subpic_partitioning_update_flag | u(1) |
| if(subpic_partitioning_update_flag) | |
|   subpic_partitioning_info( ) | |
| subpic_conf_win_update_flag | u(1) |
| if(subpic_conf_win_update_flag) | |
|   subpic_conf_win_partitioning_info( ) | |
| } | | conf_win_update_flag equal to 1 specifies that the current conf_win_info( ) is updated with the conf_win_info( ) in this pic_size_partitioning_update_info( ) conf_win_update_flag equal to 0 specifies that the current conf_win_info( ) is not updated.

tile_brick_partitioning_update_flag equal to 1 specifies that the current tile_brick_partitioning_info( ) is updated with the tile_brick_partitioning_info( ) in this pic_size_partitioning_update_info( ) conf_win_update_flag equal to 0 specifies that the current tile_brick_partitioning_info( ) is not updated.

rect_slice_partitioning_update_flag equal to 1 specifies that the current rect_slice_partitioning_info( ) is updated with the rect_slice_partitioning_info( ) in this pic_size_partitioning_update_info( ) rect_slice_partitioning_update_flag equal to 0 specifies that the current rect_slice_partitioning_info( ) is not updated.

subpic_partitioning_update_flag equal to 1 specifies that the current subpic_partitioning_info( ) is updated with the subpic_partitioning_info( ) in this pic_size_partitioning_update_info( ) subpic_partitioning_update_flag equal to 0 specifies that the current subpic_partitioning_info( ) is not updated.

subpic_conf_win_update_flag equal to 1 specifies that the current subpic_conf_win_info( ) is updated with the subpic_conf_win_info( ) in this pic_size_partitioning_update_info ( ) subpic_conf_win_update_flag equal to 0 specifies that the current subpic_conf_win_info( ) is not updated.

The obtained picture size and partitioning information pic_size_partitioning_info( ) is used to decode the coded picture, e.g., by the decoder (310). The picture size and partitioning information of the coded picture is signaled in the VPS, SPS and PPS as described above, e.g., by the encoder (303).

Figure 6:
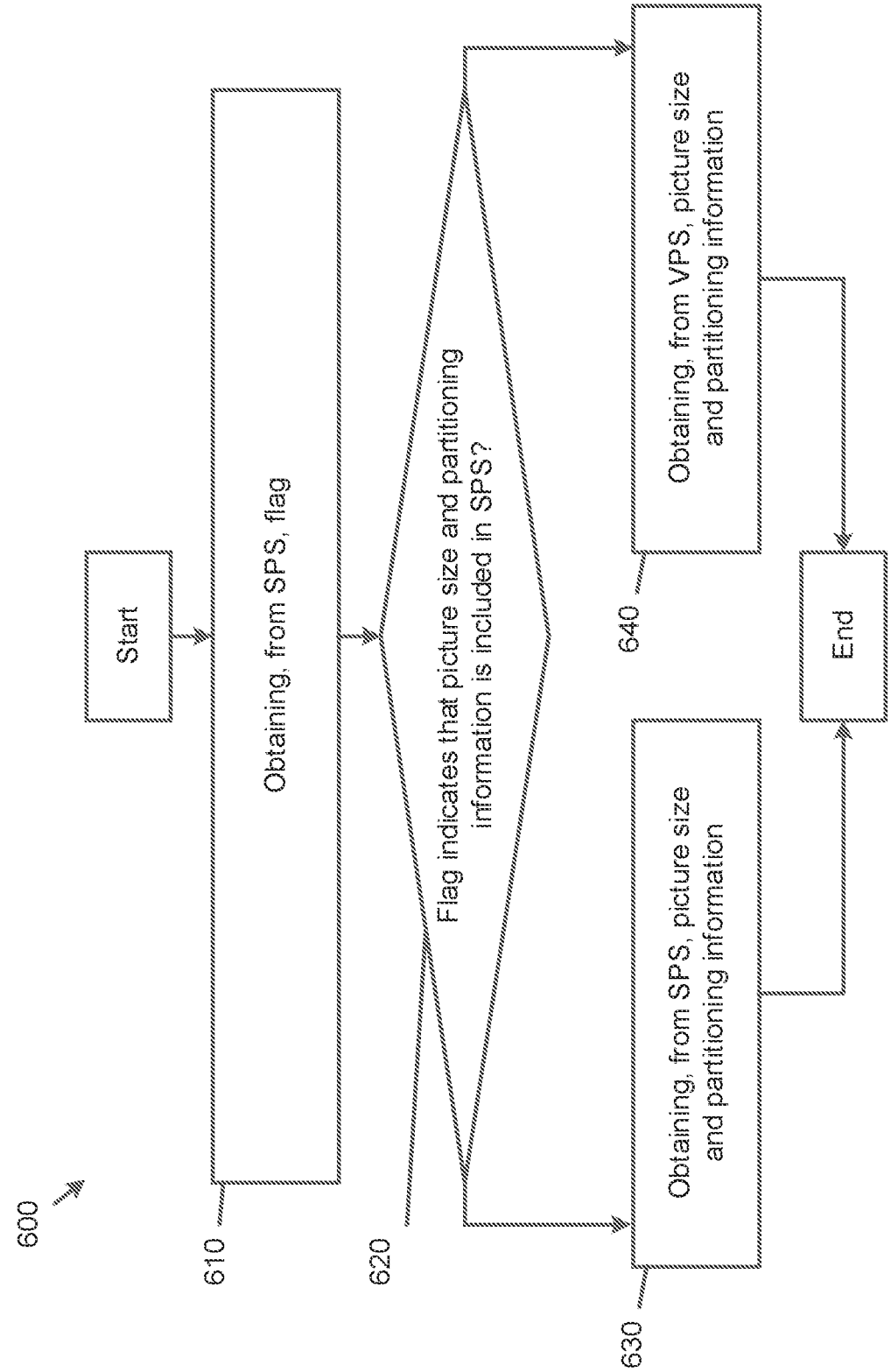
FIG. 6 is a flowchart illustrating a method of efficient signalizing of picture size and partitioning information in a video bitstream, according to embodiments.

FIG. 6 is a flowchart illustrating a method (600) of efficient signalizing of picture size and partitioning information in a video bitstream, according to embodiments. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, in a first block (610), the method (600) includes obtaining, from an SPS to which a coded picture refers, a flag indicating whether the picture size and partitioning information of the coded picture is included in the SPS.

In a second block (620), the method (600) includes determining whether the obtained flag indicates that the picture size and partitioning information is included in the SPS.

In a third block (630), the method (600) includes, based on the flag being determined to indicate that the picture size and partitioning information is included in the SPS, obtaining, from the SPS, the picture size and partitioning information.

In a fourth block (640), the method (600) includes, based on the flag being determined to indicate that the picture size and partitioning information is not included in the SPS, obtaining, from a VPS, the picture size and partitioning information that is included in the VPS.

The method (600) may further include obtaining, from the SPS, a number of picture size and partitioning information included in the SPS, and determining whether an index is less than or equal to the obtained number of picture size and partitioning information included in the SPS.

The method (600) may further include, based on the index being determined to be less than or equal to the number of picture size and partitioning information included in the SPS, incrementing the index, and obtaining, from the SPS, another flag indicating whether additional picture size and partitioning information is included in the SPS, the other flag corresponding to the incremented index. The method (600) may further include determining whether the obtained other flag indicates that the additional picture size and partitioning information is included in the SPS, based on the other flag being determined to indicate that the additional picture size and partitioning information is included in the SPS, obtaining, from the SPS, the additional picture size and partitioning information, and based on the other flag being determined to indicate that the additional picture size and partitioning information is not included in the SPS, obtaining, from the VPS, the additional picture size and partitioning information that is included in the VPS.

The picture size and partitioning information may include any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture.

Although FIG. 6 shows example blocks of the method (600), in some implementations, the method (600) may include additional blocks, fewer blocks, different blocks, or differently arranged blocks than those depicted in FIG. 6. Additionally, or alternatively, two or more of the blocks of the method (600) may be performed in parallel.

Figure 7:
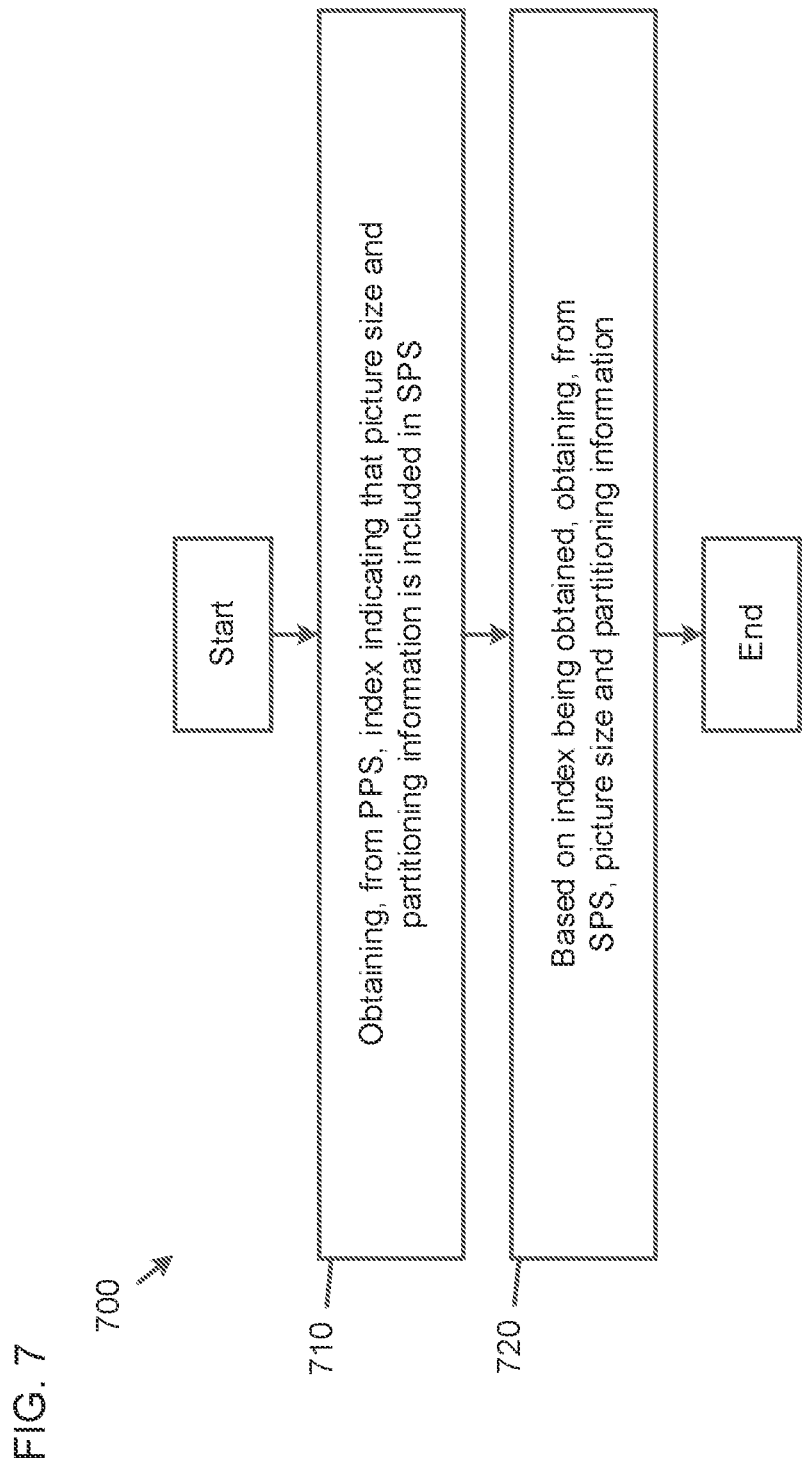
FIG. 7 is a flowchart illustrating a method of efficient signalizing of picture size and partitioning information in a video bitstream, according to embodiments.

FIG. 7 is a flowchart illustrating a method (700) of efficient signaling of picture size and partitioning information in a video bitstream, according to embodiments. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes obtaining, from a PPS to which the coded picture refers, an index indicating that the picture size and partitioning information is included in the SPS.

In a second block (720), the method (700) includes, based on the index being obtained, obtaining, from the SPS, the picture size and partitioning information.

The method (700) may further include obtaining, from a picture parameter set (PPS) to which the coded picture refers, another flag indicating whether the picture size and partitioning information is updated in the PPS, and determining whether the obtained other flag indicates that the picture size and partitioning information is updated in the PPS. The method (700) may further include, based on the obtained other flag being determined to indicate that the picture size and partitioning information is updated in the PPS, obtaining, from the PPS, the updated picture size and partitioning information.

The updated picture size and partitioning information may include any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture that are updated.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
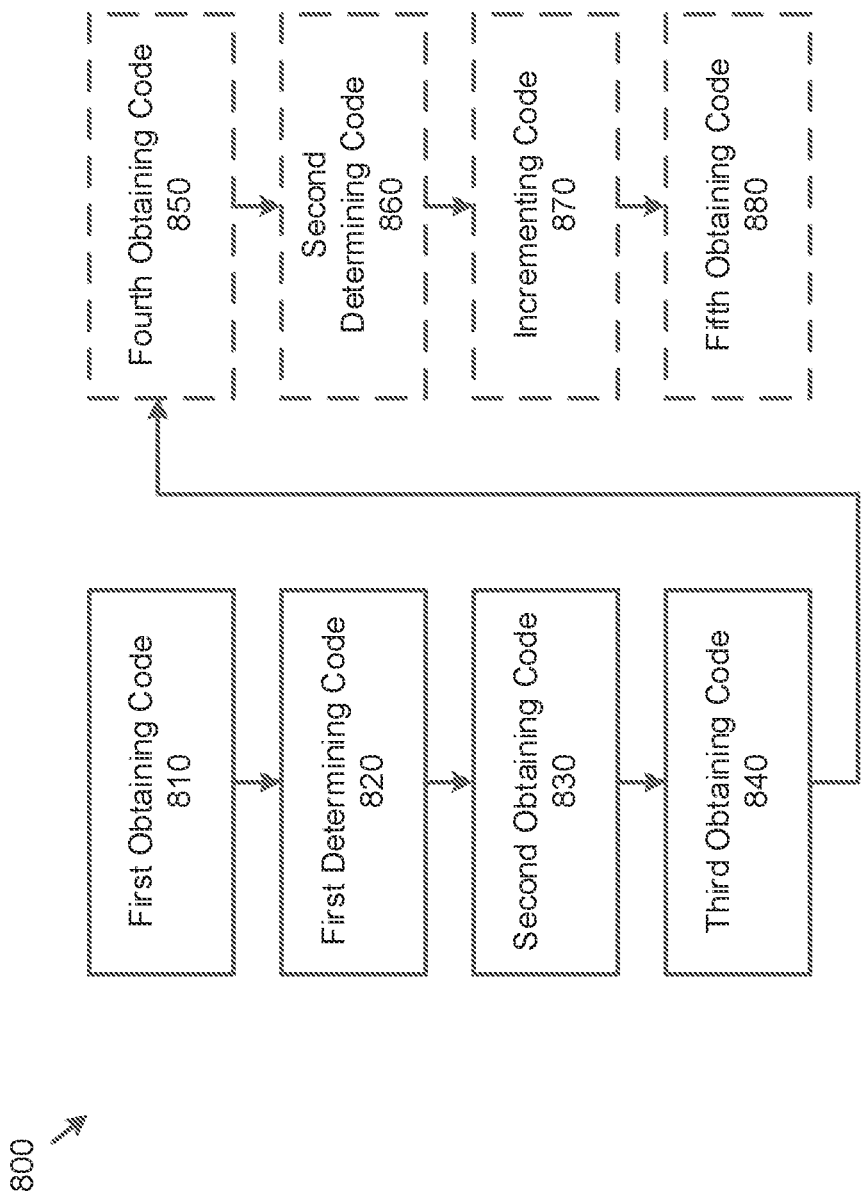
FIG. 8 is a simplified block diagram of an apparatus for efficient signaling of picture size and partitioning information in a video bitstream, according to embodiments.

FIG. 8 is a simplified block diagram of an apparatus (800) for efficient signaling of picture size and partitioning information in a video bitstream, according to embodiments.

Referring to FIG. 8, the apparatus (800) includes first obtaining code (810), first determining code (820), second obtaining code (830) and third obtaining code (840).

The first obtaining code (810) is configured to cause at least one processor to obtain, from a SPS to which a coded picture refers, a flag indicating whether the picture size and partitioning information of the coded picture is included in the SPS.

The first determining code (820) is configured to cause the at least one processor to determine whether the obtained flag indicates that the picture size and partitioning information is included in the SPS.

The second obtaining code (830) is configured to cause the at least one processor to, based on the flag being determined to indicate that the picture size and partitioning information is included in the SPS, obtain, from the SPS, the picture size and partitioning information.

The third obtaining code (840) is configured to cause the at least one processor to, based on the flag being determined to indicate that the picture size and partitioning information is not included in the SPS, obtain, from a video parameter set (VPS), the picture size and partitioning information that is included in the VPS.

The apparatus (800) may further include fourth obtaining code (850) configured to cause the at least one processor to obtain, from the SPS, a number of picture size and partitioning information included in the SPS, and second determining code (860) configured to cause the at least one processor to determine whether an index is less than or equal to the obtained number of picture size and partitioning information included in the SPS.

The apparatus (800) may further include incrementing code (870) configured to cause the at least one processor to, based on the index being determined to be less than or equal to the number of picture size and partitioning information included in the SPS, increment the index.

The first obtaining code (810) may be further configured to cause the at least one processor to obtain, from the SPS, another flag indicating whether additional picture size and partitioning information is included in the SPS, the other flag corresponding to the incremented index.

The first determining code (820) may be further configured to cause the at least one processor to determine whether the obtained other flag indicates that the additional picture size and partitioning information is included in the SPS.

The second obtaining code (830) may be further configured to cause the at least one processor to, based on the other flag being determined to indicate that the additional picture size and partitioning information is included in the SPS, obtain, from the SPS, the additional picture size and partitioning information.

The third obtaining code (840) may be further configured to cause the at least one processor to, based on the other flag being determined to indicate that the additional picture size and partitioning information is not included in the SPS, obtain, from the VPS, the additional picture size and partitioning information that is included in the VPS.

The apparatus (800) may further include fourth obtaining code (850) configured to cause the at least one processor to obtain, from a picture parameter set (PPS) to which the coded picture refers, an index indicating that the picture size and partitioning information is included in the SPS, and fifth obtaining code (880) configured to cause the at least one processor to, based on the index being obtained, obtain, from the SPS, the picture size and partitioning information.

The apparatus (800) may further include fourth obtaining code (850) configured to cause the at least one processor to obtain, from a picture parameter set (PPS) to which the coded picture refers, another flag indicating whether the picture size and partitioning information is updated in the PPS, second determining code (860) configured to cause the at least one processor to determine whether the obtained other flag indicates that the picture size and partitioning information is updated in the PPS, and fifth obtaining code (880) configured to cause the at least one processor to, based on the obtained other flag being determined to indicate that the picture size and partitioning information is updated in the PPS, obtain, from the PPS, the updated picture size and partitioning information.

The updated picture size and partitioning information may include any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture that are updated.

The picture size and partitioning information may include any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture.

FIG. 9 is a diagram of a computer system (900) suitable for implementing embodiments.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are examples in nature and are not intended to suggest any limitation as to the scope of use or functionality of the computer software implementing embodiments. Neither should the configuration of components be interpreted as having any dependency or requirement relating to any one or combination of components illustrated in embodiments of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter (950) generates and outputs images to the touch-screen (910).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks (955) commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface (954) into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of efficient signalizing of picture size in a video bitstream via a hierarchical mechanism, the method being performed by at least one processor, and the method comprising:
   receiving a coded picture;
   obtaining, from a picture parameter set (PPS) to which the coded picture refers, a first syntax element indicating a picture size comprising a width and a height associated with the coded picture, wherein the first syntax element refers to a second syntax element in a sequence parameter set (SPS);
   obtaining, from the sequence parameter set (SPS) to which the coded picture refers, the second syntax element indicating the picture size comprising the width and the height associated with the coded picture, wherein the second syntax element refers to a third syntax element in a video parameter set;
   obtaining, from the VPS to which the coded picture refers, the third syntax element indicating the picture size comprising the width and the height associated with the coded picture, wherein the third syntax element is referred to by at least a layer of a coded video sequence;
   decoding the coded picture based on values of the first syntax element, the second syntax element, and the third syntax element;
   obtaining, from the SPS, a number of picture size information included in the SPS;

determining whether an index is less than or equal to the obtained number of picture size information included in the SPS; and based on the index being determined to be less than or equal to the number of picture size information included in the SPS, incrementing the index.

2. The method of claim 1, wherein a flag is obtained based on the incremented index, wherein the flag indicates whether additional picture size information is included in the SPS.

3. The method of claim 1, further comprising:

obtaining, from a picture parameter set (PPS) to which the coded picture refers, an index indicating that picture size information is included in the SPS; and based on the index being obtained, obtaining, from the SPS, the picture size information.

4. The method of claim 1, further comprising:

obtaining, from a picture parameter set (PPS) to which the coded picture refers, an update flag indicating whether picture size information is updated in the PPS;

determining whether the update flag indicates that the picture size information is updated in the PPS; and based on the update flag being determined to indicate that the picture size information is updated in the PPS, obtaining, from the PPS, the updated picture size information.

5. The method of claim 4, wherein the updated picture size information comprises any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture that are updated.

6. The method of claim 2, wherein the picture size information comprises any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture.

7. An apparatus for efficient signaling of picture size and partitioning information in a video bitstream, the apparatus comprising:

at least one memory configured to store computer program code; and at least one processor configured to access the at least one memory and operate according to the computer program code, the computer program code comprising:

receiving code configured to cause the at least one processor to receive a coded picture;

first obtaining code configured to cause the at least one processor to obtain, from a picture parameter set (PPS) to which the coded picture refers, a first syntax element indicating a picture size comprising a width and a height associated with the coded picture, wherein the first syntax element refers to a second syntax element in a sequence parameter set (SPS);

second obtaining code configured to cause the at least one processor to obtain, from the sequence parameter set (SPS) to which the coded picture refers, the second syntax element indicating the picture size comprising the width and the height associated with the coded picture, wherein the second syntax element refers to a third syntax element in a video parameter set;

third obtaining code configured to cause the at least one processor to obtain, from the VPS to which the coded picture refers, the third syntax element indicating the picture size comprising the width and the height associated with the coded picture, wherein the third syntax element is referred to by at least a layer of a coded video sequence; and decoding code configured to cause the at least one processor to decode the coded picture based on values of the first syntax element, the second syntax element, and the third syntax element;

fourth obtaining code configured to cause the at least one processor to obtain, from the SPS, a number of picture size information included in the SPS;

determining code configured to cause the at least one processor to determine whether an index is less than or equal to the obtained number of picture size information included in the SPS; and incrementing code configured to cause the at least one processor to, based on the index being determined to be less than or equal to the number of picture size information included in the SPS, increment the index.

8. The apparatus of claim 7, wherein a flag is obtained based on the incremented index, wherein the flag indicates whether additional picture size information is included in the SPS.

9. The apparatus of claim 7, wherein the program code further comprises:

fourth obtaining code configured to cause the at least one processor to obtain, from a picture parameter set (PPS) to which the coded picture refers, an index indicating that picture size information is included in the SPS; and fifth obtaining code configured to cause the at least one processor to, based on the index being obtained, obtain, from the SPS, the picture size information.

10. The apparatus of claim 7, wherein the program code further comprises:

fourth obtaining code configured to cause the at least one processor to obtain, from a picture parameter set (PPS) to which the coded picture refers, an update flag indicating whether picture size information is updated in the PPS;

determining code configured to cause the at least one processor to determine whether the update flag indicates that the picture size information is updated in the PPS; and fifth obtaining code configured to cause the at least one processor to, based on the update flag being determined to indicate that the picture size information is updated in the PPS, obtain, from the PPS, the updated picture size information.

11. The apparatus of claim 10, wherein the updated picture size information comprises any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture that are updated.

12. The apparatus of claim 7, wherein the picture size information comprises any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture.

13. A non-transitory computer-readable storage medium storing instructions that cause at least one processor to:

receive a coded picture;

obtain, from a picture parameter set (PPS) to which the coded picture refers, a first syntax element indicating a picture size comprising a width and a height associated with the coded picture, wherein the first syntax element refers to a second syntax element in a sequence parameter set (SPS);

obtain, from the sequence parameter set (SPS) to which the coded picture refers, the second syntax element indicating the picture size comprising the width and the height associated with the coded picture, wherein the second syntax element refers to a third syntax element in a video parameter set;

obtain, from the VPS to which the coded picture refers, the third syntax element indicating the picture size comprising the width and the height associated with the coded picture, wherein the third syntax element is referred to by at least a layer of a coded video sequence; and decode the coded picture based on values of the first syntax element, the second syntax element, and the third syntax element;

obtain, from the SPS, a number of picture size information included in the SPS;

determine whether an index is less than or equal to the obtained number of picture size information included in the SPS; and based on the index being determined to be less than or equal to the number of picture size information included in the SPS, increment the index.

14. The non-transitory computer-readable storage medium of claim 13, wherein a flag is obtained based on the incremented index, wherein the flag indicates whether additional picture size information is included in the SPS.

15. The non-transitory computer-readable storage medium of claim 13, wherein the instructions further cause the at least one processor to:

obtain, from a picture parameter set (PPS) to which the coded picture refers, an index indicating that picture size information is included in the SPS; and based on the index being obtained, obtain, from the SPS, the picture size information.

16. The non-transitory computer-readable storage medium of claim 13, wherein the instructions further cause the at least one processor to:

obtain, from a picture parameter set (PPS) to which the coded picture refers, an update flag indicating whether picture size information is updated in the PPS;

determine whether the update flag indicates that the picture size information is updated in the PPS; and based on the update flag being determined to indicate that the picture size information is updated in the PPS, obtain, from the PPS, the updated picture size information.

17. The non-transitory computer-readable storage medium of claim 15, wherein the picture size information comprises any one or any combination of conformance window offsets of the coded picture, tile brick partitioning information of the coded picture, rectangular slice partitioning information of the coded picture, sub-picture partitioning information of the coded picture and sub-picture conformance window offsets of the coded picture.

* * * * *